United States Patent
Adolf et al.

(10) Patent No.: US 9,421,913 B2
(45) Date of Patent: Aug. 23, 2016

(54) BRACKET FOR RELEASABLE SECUREMENT OF A CARGO COMPARTMENT FLOOR AND VEHICLE WITH THE BRACKET

(71) Applicant: AUDI AG, Ingolstadt (DE)

(72) Inventors: Robert Adolf, Ingolstadt (DE); Tobias Schwab, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/422,143

(22) PCT Filed: Aug. 2, 2013

(86) PCT No.: PCT/EP2013/002314
§ 371 (c)(1),
(2) Date: Feb. 17, 2015

(87) PCT Pub. No.: WO2014/029467
PCT Pub. Date: Feb. 27, 2014

(65) Prior Publication Data
US 2015/0232035 A1 Aug. 20, 2015

(30) Foreign Application Priority Data
Aug. 18, 2012 (DE) .......................... 10 2012 016 440

(51) Int. Cl.
*B60R 7/04* (2006.01)
*B60R 5/00* (2006.01)
*B60Q 3/06* (2006.01)
*F21V 23/04* (2006.01)
*F21Y 101/02* (2006.01)

(52) U.S. Cl.
CPC . *B60R 7/04* (2013.01); *B60Q 3/06* (2013.01); *B60R 5/00* (2013.01); *F21V 23/04* (2013.01); *F21Y 2101/02* (2013.01); *Y10T 292/1043* (2015.04); *Y10T 292/1051* (2015.04)

(58) Field of Classification Search
CPC ............. B60R 7/04; B60R 5/00; B60Q 3/06; F21V 23/04; F21Y 2101/02; Y10T 292/1043; Y10T 292/1051
USPC ........................................................ 296/37.1
See application file for complete search history.

(56) References Cited

U.S. PATENT DOCUMENTS 6,866,319 B2 * 3/2005 Hupfer ...................... B60R 7/04
224/282
6,929,294 B2 * 8/2005 Byrla ........................ B60Q 1/26
292/336.3

(Continued)

FOREIGN PATENT DOCUMENTS

| CN | 101839097 | 9/2010 |
| DE | 102 60 984 A1 | 8/2004 |

(Continued)

OTHER PUBLICATIONS

International Search Report issued by the European Patent Office in International Application PCT/EP2013?002314.

(Continued)

*Primary Examiner* — Joseph D Pape
*Assistant Examiner* — Dana Ivey
(74) *Attorney, Agent, or Firm* — Henry M. Feiereisen LLC

(57) ABSTRACT

A bracket for releasable securement of a cargo compartment floor, which is swingable about an axis in a vehicle in the opened position includes a holding device which, in an installed condition, can be swiveled or pushed from a starting position in which it projects from a surface of a cargo compartment lining elastically at least partially into the cargo compartment lining. A lighting device is provided in the part of the holding device which, in the starting position, projects from the cargo compartment lining.

12 Claims, 3 Drawing Sheets

(56) References Cited

U.S. PATENT DOCUMENTS

| | | | |
|---|---|---|---|
| 8,205,926 B2 * | 6/2012 | Beckley | B60R 5/04 296/37.14 |
| 8,858,020 B2 | 10/2014 | Schwab et al. | |
| 2010/0187857 A1 | 7/2010 | Fischer et al. | |

FOREIGN PATENT DOCUMENTS

| | | |
|---|---|---|
| DE | 103 35 582 A1 | 3/2005 |
| DE | 10 2004 031004 A1 | 1/2006 |
| DE | 10 2007 042 371 A1 | 3/2009 |
| DE | 10 2011 010 458 A1 | 10/2011 |

OTHER PUBLICATIONS

Chinese Search Report issued on Aug. 26, 2015 with respect to counterpart Chinese patent application 201380005930.x.

Translation of Chinese Search Report issued on Aug. 26, 2015 with respect to counterpart Chinese patent application 201380005930.x.

* cited by examiner

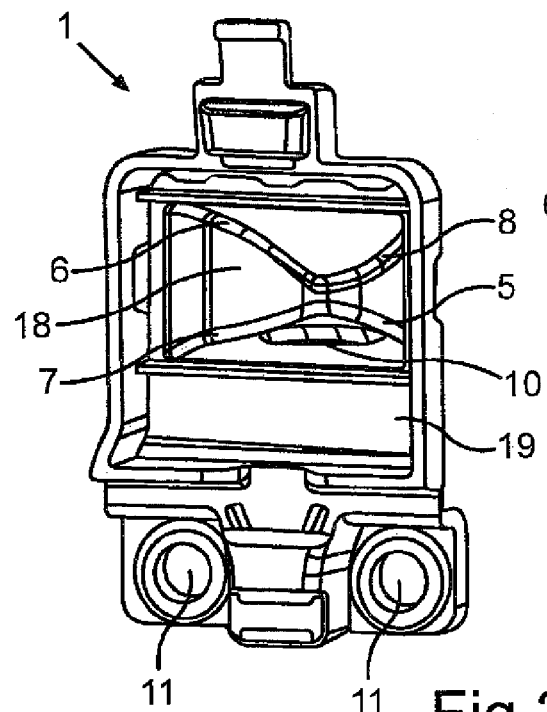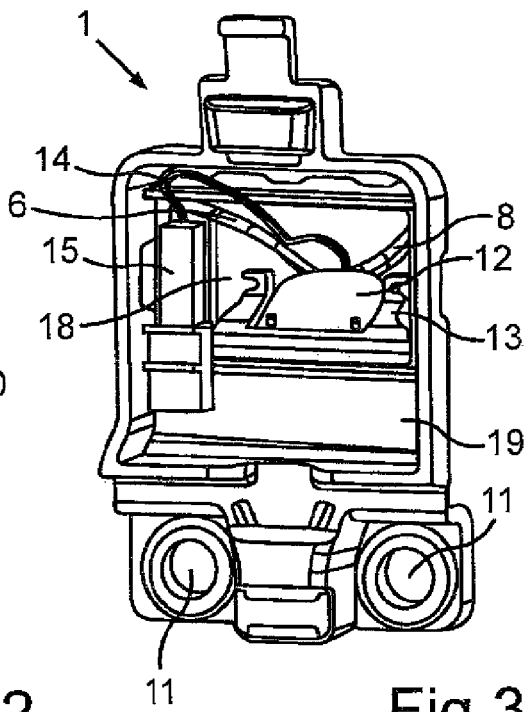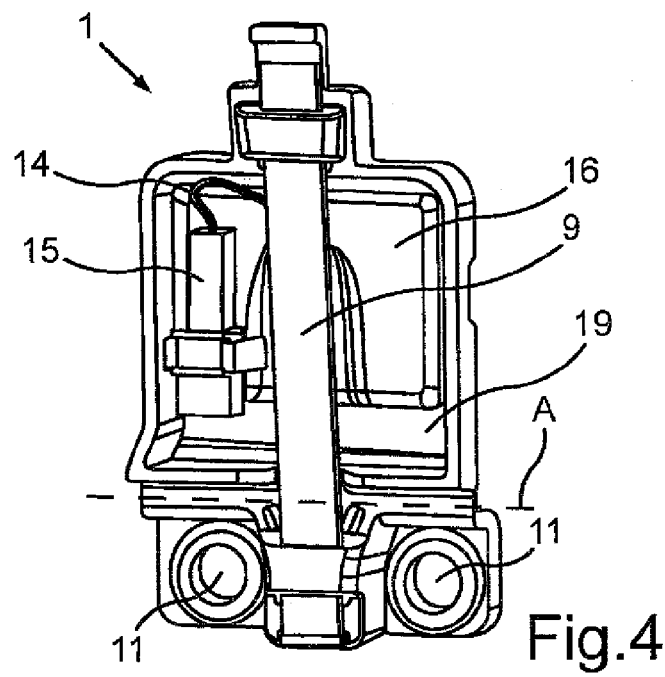

BRACKET FOR RELEASABLE SECUREMENT OF A CARGO COMPARTMENT FLOOR AND VEHICLE WITH THE BRACKET

CROSS-REFERENCES TO RELATED APPLICATIONS

This application is the U.S. National Stage of International Application No. PCT/EP2013/002314, filed Aug. 2, 2013, which designated the United States and has been published as International Publication No. WO 2014/029467 and which claims the priority of German Patent Application, Serial No. 10 2012 016 440.8, filed Aug. 18, 2012, pursuant to 35 U.S.C. 119(a)-(d).

BACKGROUND OF THE INVENTION

The present invention relates to a bracket and to a vehicle with a bracket in accordance with the invention.

(Motor) vehicles are known that, in the area of their cargo compartment, have a cargo compartment floor below which a stowage space, which can be covered by the cargo compartment floor, is located. The cargo compartment floor is normally pivotable or swingable about an axis, in particular a transverse axis of the (motor) vehicle.

In (motor) vehicles in which the cargo compartment is accessible through the rear of the vehicle, the pivot axis of the cargo compartment floor is normally spaced from the rear end of the motor vehicle in the direction of the rear seats. For opening the cargo compartment floor, a handle, which is normally arranged in the cargo compartment floor in the vicinity of the rear end of the vehicle, can be used to open and lift up or swing open the cargo compartment floor. As a result of the swivel axis in the floor area of the cargo compartment and of the oftentimes limited space conditions, the cargo compartment floor oftentimes assumes in an open position an angle of less than 90° with respect to the longitudinal axis of the vehicle.

Given these circumstances, for the cargo compartment floor to maintain its open position during loading and unloading of a cargo compartment, which can be covered by the cargo compartment floor, without further action by a user, holding devices have been developed for maintaining the cargo compartment floor in place.

DE 10 2004 031 004 A1, for example, describes a locking device for locking a lifted position of a cargo compartment floor which can be lifted up about a swivel axis, in particular a transverse axis of a vehicle, wherein a retaining element in a side wall of a cargo compartment running approximately perpendicular to the swivel axis is mounted for movement in a direction running approximately parallel to the swivel axis between a position into the side wall and a position out of the side wall. The retaining element is spring-loaded to seek its extended position and secured in its retracted position by a push-push mechanism known per se, and can be activated for a movement out of this secured position by application of pressure.

And DE 10 2011 010 458 A1 discloses a holding device for holding a cargo floor, in particular for a motor vehicle, in an open position in which a stowage space that can be covered by the cargo floor is accessible, with the holding device including at least one resilient retaining element which allows a movement of the cargo floor in its deformed state and holds the cargo floor in its open position in its non-deformed state.

SUMMARY OF THE INVENTION

Object of the present invention is to provide an improved holding device for a cargo compartment floor in comparison to the previously known state of the art and also an improved (motor) vehicle.

According to one aspect of the invention, the object is achieved by a bracket having a holding device which in an installed state is resiliently swingable or pushable from an initial position, in which it projects from a surface of a cargo compartment lining, at least in part, into the cargo compartment lining and a lighting device which is provided in the part of the holding device that projects in the initial position from the cargo compartment lining.

According to one aspect of the invention, the object is achieved by a vehicle having a bracket as set forth above. Advantageous and practical refinements of the invention are subject matter of the dependent claims.

A bracket according to the invention for releasable securement of a cargo compartment floor, swingable about an axis, in a vehicle in its lifted position is proposed, which is characterized in that, in an installed state, a holding device of the bracket is resiliently swingable or pushable, at least in part, from an initial position in which it projects out from a surface of a cargo compartment lining into the cargo compartment lining (luggage compartment lining), and provision is made for a lighting device in the part of the holding device that projects out in the initial position from the cargo compartment lining.

The bracket according to the invention has the advantage that not only is a simple and safe releasable securement of a swingable cargo compartment floor possible, but also a particularly advantageous positioning of the lighting device is established.

According to a first advantageous refinement of the bracket according to the invention, the light exit direction of the light-emitting device points in the installed state of the bracket substantially in the direction of the cargo compartment floor in its closed position.

An illumination of both the top of the cargo compartment floor in its closed position and an illumination of the stowage space located below the cargo compartment floor, when the cargo compartment floor assumes an open position, can advantageously be achieved by such a light exit direction.

According to a second advantageous refinement, the holding device of the bracket has at least two curved and/or slanted first and second edges that are substantially diagonally opposite to each other and configured such that, in the installed state, the holding device is swingable or pushable from an initial position to a position in which the holding device is at least partially pivoted or pushed into the cargo compartment lining, when an edge of the cargo compartment floor slides in contact along the first or second edge.

A releasable securement of the cargo compartment floor can be achieved for a user by this refinement in a particularly simple manner, when the cargo compartment floor slides with one of its (oftentimes lateral) edges, during lifting or swinging, with contact past the first, in the installed state oftentimes lower, curved and/or slanted edge of the holding device, which edge points toward the rear of the vehicle, and when the holding device is pivoted or pushed at least in part into the cargo compartment lining by the pressure exerted by the edge of the cargo compartment floor upon the first or second edge of the holding device. As soon as the edge of the cargo compartment floor is moved past the holding device, the holding device returns to its initial position as a result of its resilient attachment. When the user now lets go of the cargo compartment floor, the latter will be releasably held in an open position by the holding device having again returned to the initial position, i.e., the lateral edge of the cargo compartment floor is supported upon the second, in the installed state oftentimes upper, edge of the holding device.

When the user now applies force to the upper side of the cargo compartment floor in the direction of the stowage space, the pressure increases via the supported edge of the cargo compartment floor on the second curved and/or slanted edge of the holding device. As the holding device can be resiliently pivoted or pushed, the holding device evades the pressure in the direction of the cargo compartment lining and the supported edge of the cargo compartment floor slides along the second edge of the holding device. The holding device is thereby again, at least in part, pivoted or pushed into the cargo compartment lining. When the supported edge of the cargo compartment floor has passed the holding device, the latter returns again to its initial position as a result of its resilient attachment. The cargo compartment floor can now be lowered to a final position by the user.

According to a further advantageous refinement of the invention, the holding device includes two curved and/or slanted first and second edges, substantially diagonally opposite to each other, that are designed such that in a first installed state the holding device is swingable or pushable by an edge of the cargo compartment floor in sliding contact along the first or second edge from an initial position to a position at least partially pivoted or pushed into the cargo compartment lining. Further, according to this refinement, the holding device has two curved and/or slanted third and fourth edges substantially diagonally opposed to each other, that are designed such that, in a second installed state, the holding device is swingable or pushable by an edge of the cargo compartment floor in sliding contact along the third or fourth edge from the initial position to the position at least partially pivoted or shifted into the cargo compartment lining.

Advantageously and without loss of functionality, the bracket according to the invention can be arranged as a result of such a configuration in two cargo compartment linings that are for example substantially opposite to and facing each other. Thus, for example, only one configuration of the bracket according to the invention needs to be produced for a left side and a right side cargo compartment lining, providing cost benefits.

According to a further advantageous refinement of the invention, the lighting device in the bracket according to the invention is a light emitting diode. Using a light-emitting diode, a lasting and energy-efficient lighting device can be realized in an advantageous manner.

According to yet another advantageous refinement of the invention, the bracket has at least one spring member for resiliently swinging or pushing the bracket, with the at least one spring member being in a less tensed state, when the bracket assumes the initial position, than in the pivoted or pushed state.

This refinement permits in an advantageous manner the possibility that a spring member having a spring constant suited to and/or appropriate for each situation can be selected and used in dependence on circumstances relating to the cargo compartment floor (for example, weight of the cargo compartment floor, lie angle of a lateral edge of the cargo compartment floor on the holding device in an open position) and/or relating to the external design of the holding device (for example slant and/or curvature of the edges).

According to still another advantageous refinement of the invention, the bracket further includes a switching device for switching the light of the lighting device on and off, or is electrically connectable to such a switching device.

When the bracket according to the invention has a switching device for switching the light on and off, the light of the bracket can be switched on and off in an advantageous manner, regardless of an opening state of a vehicle door. For example, this is advantageous in a vehicle in which a cargo compartment floor can be opened and closed by a user located inside the vehicle.

When the bracket is electrically connectable with a switching device for switching the light on and off, there is the advantage that the light of the bracket can be turned on and off via, for example, a switch in the region of the dashboard and/or depending on an opening state of a vehicle door.

The present invention also includes a vehicle, in particular motor vehicle, which is characterized in that it includes at least a bracket according to the invention in accordance with one of the claims 1 to 7.

According to a first advantageous refinement, the vehicle has at least a bracket in accordance with one of the claims 1 to 7 in at least one longitudinal side of the cargo compartment lining. And, according to a second advantageous refinement, the vehicle has a bracket in accordance with one of the claims 1 to 7 in each of a right and a left longitudinal side of the cargo compartment lining.

BRIEF DESCRIPTION OF THE DRAWING

The present invention is explained in greater detail with reference to the accompanying drawings.

It is shown purely schematically in:

FIG. 2 the backside of an example of a bracket according to the invention in the uninstalled state;

FIG. 3 the backside of an example of a bracket according to the invention in uninstalled state with light stone, circuit board, cable and plug;

FIG. 4 the backside of an example of a bracket according to the invention in uninstalled state with cover, cable, plug and spring member.

DETAILED DESCRIPTION OF PREFERRED EMBODIMENTS

Figure 1:
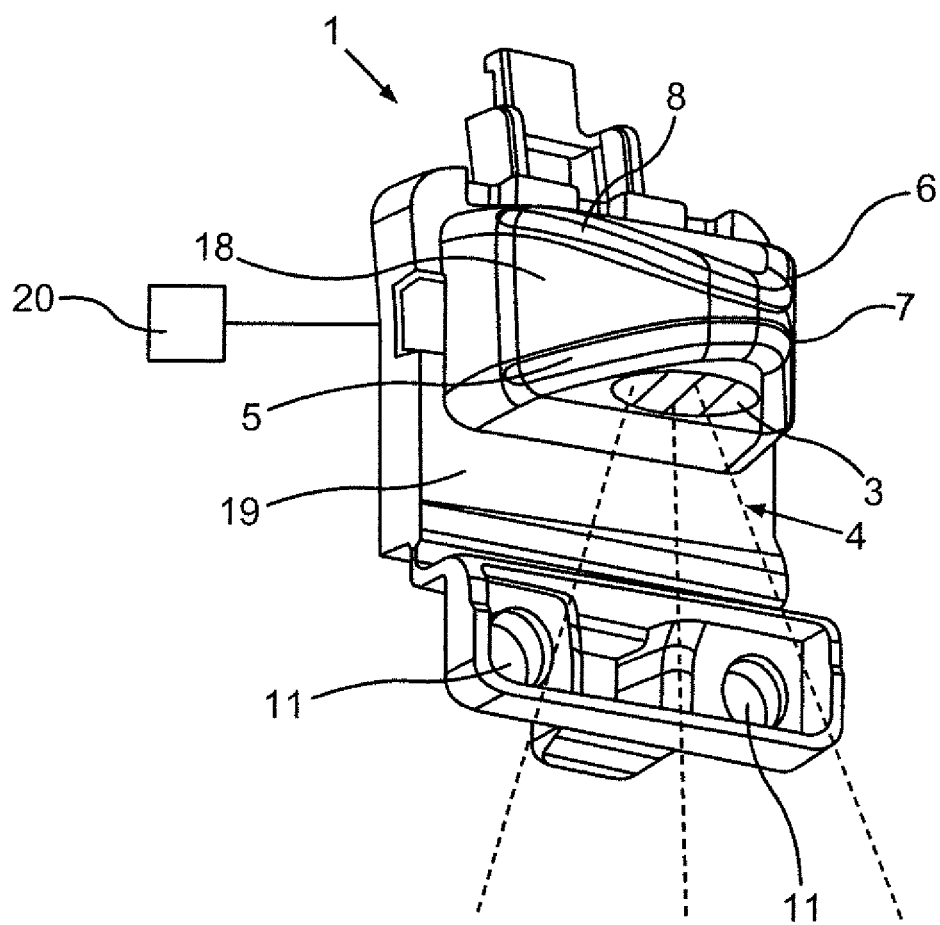
FIG. 1 the visible side of an example of a bracket according to the invention in the uninstalled state.
Figure 5:
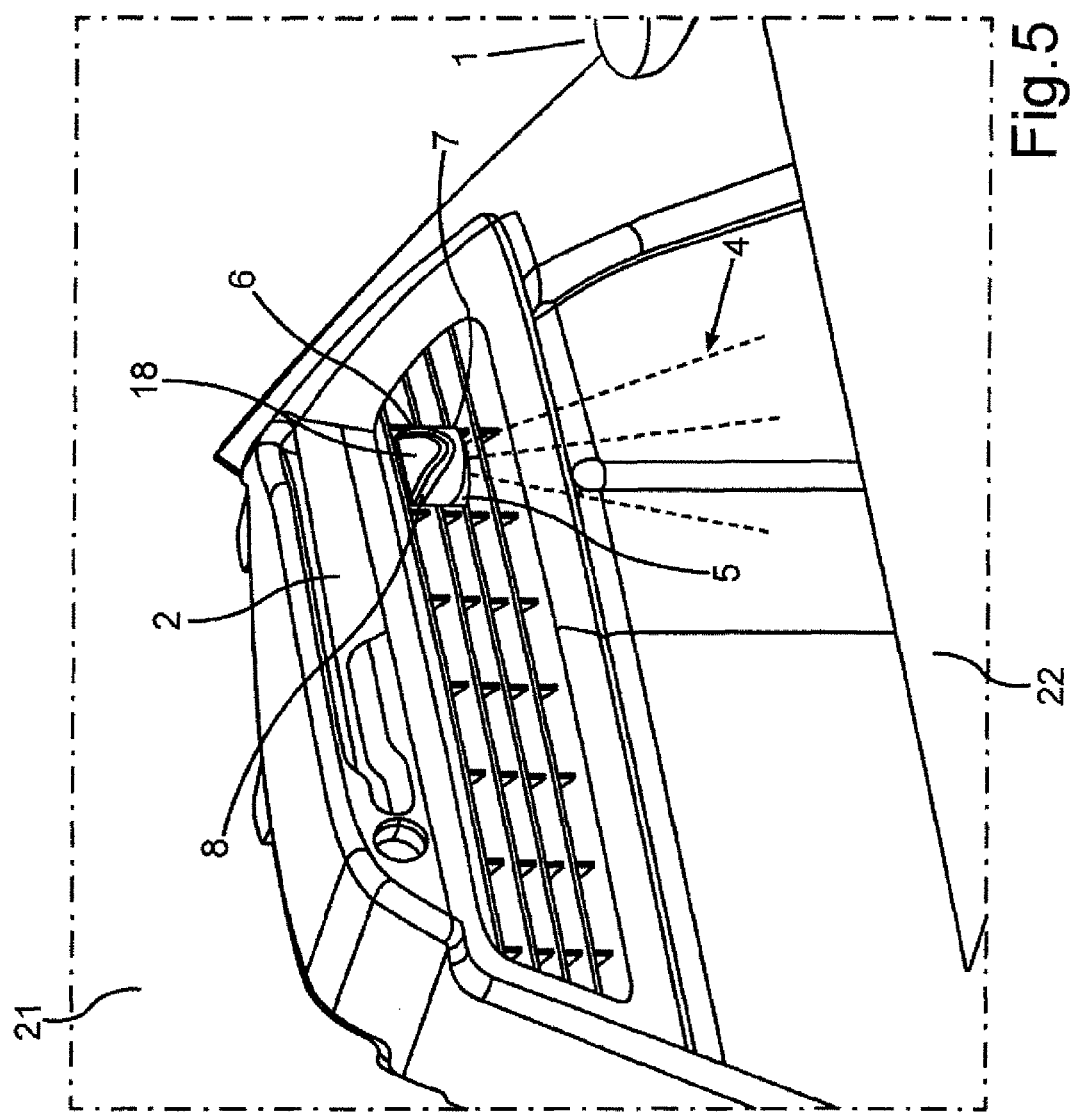
FIG. 5 a detail of an example of a cargo compartment lining with an example of a bracket which, in its initial position, projects out from the surface of the cargo compartment lining.

In the figures, identical, functionally identical or functionally similar elements are provided with the same reference signs.

The exemplary embodiments described hereinafter in more detail illustrate preferred embodiments of the present invention. The present invention is, of course, not limited to these embodiments.

An opening 10 for the lighting device 3 is provided in an outer surface area of the detent nose 18. This outer surface area of the detent nose 18 represents preferably the one surface that points substantially in the direction of the cargo compartment floor 22 in its closed state, when the bracket 1 is installed in a vehicle, in particular in a motor vehicle 21. The light exit direction 4 of the lighting device 3 points in an installed state also substantially in the direction of the cargo compartment floor 22 in its closed position, or in the direction of the stowage space located underneath/behind it.

In addition to the elements of the bracket 1 according to the invention that are visible in the installed state, FIG. 1 also shows elements of the bracket 1 according to the invention that are not visible in the installed state, such as the base body 19 of the bracket 1 with the openings 11 by which the bracket 1 can be mounted to a cargo compartment lining 2 for example.

The bracket 1 according to the invention has in the exemplary embodiment shown in FIG. 1 a "detent nose" as holding device 18. The detent nose 18 is formed, for example, as a hollow body with four outer surface areas that are arranged like a quadrilateral pyramid. However, the outer surface areas and thus also the edges 5, 6, 7, 8, of the outer surface areas are curved, and the hollow body does not terminate in a pointed end, but in the form of a leading, distal (as viewed from the base body 19), and rounded surface. A switch 20 is provided for controlling a lighting device 3.

An opening 10 for the lighting device 3 is provided in an outer surface area of the detent nose 18. This outer surface area of the detent nose 18 represents preferably the one surface that points substantially in the direction of the cargo compartment floor in its closed state, when the bracket 1 is installed in a vehicle, in particular in a motor vehicle. The light exit direction 4 of the lighting device 3 points in an installed state also substantially in the direction of the cargo compartment floor in its closed position, or in the direction of the stowage space located underneath/behind it.

The two slanted and curved edges 5, 6 enable the bracket to be pivoted or pushed in a particularly simple manner from the initial position into a position at least partially pivoted or pushed into the cargo compartment, when one edge of the cargo compartment floor slides in contact there along.

Against the background of a frequently used embodiment of a cargo compartment floor having a swivel axis (pivot axis) which runs substantially transverse to the longitudinal axis of the vehicle, the lateral edges of a cargo compartment floor move substantially along the surface of lateral cargo compartment linings 2 provided in the vehicle, so long as the cargo compartment floor is opened or closed.

In the presence of a sufficiently small distance between a lateral edge of the cargo compartment floor and a lateral cargo compartment lining 2 and in the presence of a suitable arrangement of the bracket 1 according to the invention in the lateral cargo compartment lining 2, one of the lateral edges of the cargo compartment floor will come, when opening the cargo compartment floor, into contact with the slanted and curved edge 5 of the holding device 18 at a particular and predefined opening angle. When the cargo compartment floor is opened further, the lateral edge of the cargo compartment floor exerts pressure upon the slanted and curved edge 5 and hence upon the entire holding device 18 in the direction of the surface of the lateral cargo compartment lining 2.

As the holding device 18 is swingable or pushable in a resilient manner into the lateral cargo compartment lining 2, the holding device 18 can be pivoted or pushed, at least in part, into the cargo compartment lining 2 by the pressure applied by the lateral edge of the cargo compartment floor.

As soon as the lateral edge of the cargo compartment floor has slid past the edge 5 and the adjacent rounded leading surface, the holding device 18, due to its resilient attachment, again swings out from the lateral cargo compartment lining or is pushed out from the lateral cargo compartment lining.

The extent to which the holding device 18 can again swing out or be pushed out from the lateral cargo compartment lining 2 is dependent on whether, and if so at what point, contact of the slanted and curved edge 6 with the lateral edge of the cargo compartment floor occurs. The further such a contact point is distanced from the leading rounded surface of the detent nose 18, the farther the holding device 18 can swing back or be pushed back out of the lateral cargo compartment lining in the direction of its initial position.

When the lateral edge of the cargo compartment floor is slid past the second edge 6, and the opening angle between cargo compartment floor and the horizontal is less than 90°, the cargo compartment floor will come to rest with its lateral edge, due to the force of gravity, upon the second edge 6 of the holding device 18 that is now again in the initial position, when a user lets go of the cargo compartment floor.

By appropriate selection or combination of slant and/or curvature of the second edge 6 and the spring constant of the means that render the holding device 18 resiliently swingable or pushable, and taking into account the weight of the cargo compartment floor and the lie angle of its lateral edge upon the second edge 6, it can be realized that the holding device 18 remains in a position substantially corresponding to the initial position, when the lateral edge of the cargo compartment floor comes to rest upon the second edge 6. In this way, a releasable securement of the cargo compartment floor is achieved.

When a user now exerts from the situation just described a pressure (force) on the cargo compartment floor such that the pressure of the lateral edge of the cargo compartment floor on the second edge 6 is greater than the gravity, the holding device 18 evades this increased pressure due its ability to resiliently swing or be pushed, and is pivoted or pushed from the initial position again into a position in which it is, at least in part, pivoted into or pushed into the cargo compartment lining. The extent of pivoting or pushing is hereby again dependent on the position of the lateral edge of the cargo compartment floor along the second edge 6.

When the lateral edge of the cargo compartment floor has slid across the second edge 6, the rounded leading (viewed from the surface to the base body 19 distal) surface of the holding device 18, and the first edge 5, the cargo compartment floor can be moved further into a closed position. As soon as the lateral edge of the cargo compartment floor has no contact with the first edge 5, the holding device 18 has or will be returned/returns completely to its initial position.

In the exemplary embodiment shown in FIG. 1, the holding device 18 in the form of a detent nose has a third edge 7 formed as a mirror image of the first edge 5, and a fourth edge 8 formed as a mirror image of the second edge 6 (the mirror plane extends from the distal end of the leading, distal, rounded surface in direction of the base body 19, with the mirror plane extending vertically from top to bottom and substantially intersecting the surface of the base body 19 at an angle of) 90°. This provides the advantage that one and the same embodiment of the bracket 1 can be used both in the installed position described above and also in an installed position in which a lateral edge of a cargo compartment floor, when being opened, is in sliding contact past the third edge 7, and in which the lateral edge of the cargo compartment floor, when being closed again, is in sliding contact past the fourth edge 8.

A typical example of such a "dual" use of the bracket 1 according to the invention involves here a situation in which a bracket 1 according to the invention is provided in both longitudinal cargo compartment linings in the rear part of a vehicle, in particular a motor vehicle. In this case, a cargo compartment floor can be held in an open state even more secure as both its lateral edges rest on the two brackets 1 according to the invention, than would be the case with only one bracket 1 according to the invention.

Of course, a symmetrical configuration of the bracket 1 according to the invention with four slanted and/or curved edges on the holding device 18 is not obligatory. When the holding device 18 should be designed in the form of a detent nose which can be pivoted or pushed into a cargo compartment lining at least in part by an edge of a cargo compartment floor sliding by in contact, and when two further substantially oppositely disposed brackets 1 according to the invention are provided in the vehicle, a first bracket 1 may for example have the first edge 5 and the second edge 6, and a second bracket 1 may for example have the third edge 7 and the fourth edge 8. Even though such a combination requires the need for two differently designed brackets 1, there is also a greater flexibility in designing the outer configuration of the exemplary bracket 1.

The appropriate curvature/slant of the edges and hence the shape of the outer surface areas of a detent nose can be determined by an artisan with few tests, based for example on the installation position of the cargo compartment floor (contact point and lie angle of an edge of the cargo compartment floor in an open position upon the holding device 18) and the weight of the cargo compartment floor, for example. The same applies to the spring constant of the means by which the holding device 18 can be resiliently pivoted or pushed at least partially into the cargo compartment lining. The slant or curvature of the first and third edges 5, 7 may in this case deviate from the slant or curvature of the second and fourth edges 6, 8.

The backside of the bracket 1 according to the invention shown in FIG. 1 is the subject matter of the illustration of FIG. 2. As already described above, the holding device 18 (detent nose) has, in the example shown, the opening 10 for the lighting device 3 in an outer surface area. There are no particular restrictions with respect to the type and the structure of the lighting device 3, and any suitable lighting device 3 can be used, for example a lighting device 3 having an incandescent lamp, gas discharge lamp or a light emitting diode (inorganic light emitting diode(s) and/or organic light emitting diode(s)) as light source. Furthermore, the lighting device 3 can have a light guiding body for scattering, directing, reflecting, and/or deflecting the light beams emitted by the light source (in the form of a diffuser, light conductor, lighting stone, reflector, for example), in particular to direct the light beams substantially in the direction of the cargo compartment floor in its non-opened state, or substantially in the direction of the subjacent stowage space. Thus, the light guiding body may also be provided to achieve a substantially even illumination of the region of the cargo compartment floor, or the stowage space located underneath/behind it, that can be illuminated by the lighting device 3.

In a preferred case, the lighting device 3 has one or more light emitting diode(s) (inorganic light emitting diode(s) and/or organic light emitting diode(s)) as light source. As is schematically indicated in FIG. 3, such a lighting device 3 has a circuit board 12 that contains the light-emitting diode (s) and electronic components required for controlling the light-emitting diode(s). Such a board can be connected with a body 13 for scattering, directing, reflecting, and/or deflecting (in the form of a diffuser, light conductor, lighting stone, reflector, for example) light beams emitted by the light emitting diode (optionally releasable). The lighting device 3 is positioned within the holding device 18 such that the light beams generated by the light-emitting diode(s) are radiated through the opening 10 substantially in the direction of the cargo compartment floor in its non-opened state, or substantially in the direction of the subjacent stowage space.

Furthermore, a cable 14 is provided to supply the lighting device 3 with electric current in the example shown in FIG. 3, and is electrically connected to a plug 15. This cable 14 is connected in the installed state to a power supply of the vehicle via the plug 15. However, the power supply of the lighting device 3 can also be provided in other ways and by other means.

Furthermore, as shown schematically in FIG. 4, the bracket 1 can optionally have a cover 16 to prevent stray light, for example.

In order to establish a resilient swingability or shiftability of the exemplified bracket 1 with the holding device 18, a strip-shaped spring member 9 may be provided, as is the case shown in the example illustrated in FIG. 4. Of course, any other means can be used that are suitable to achieve a resilient swingability or shiftability of the bracket 1 according to the invention. Further examples of such means include rubber-elastic material, helical springs, elastic foam material, etc.

In the example shown in FIG. 4, the holding device 18 can essentially swing about an axis A. Of course, this type of swingability is not mandatory and other axes suitable for swingability can be selected. In case the bracket 1 can be shifted, suitable guide elements (rail elements) can be provided within which and/or on which the bracket 1 in accordance with the invention can move back and forth.

In the example shown in the figures, the bracket 1 has two openings 11 in its base body 19, via which the bracket 1 can be attached to a lateral cargo compartment lining, for example. There are no particular restrictions on the fasteners and any suitable fasteners may be used, such as, for example, bolts, rivets, clips, clamps, etc. It is, of course, also possible to secure the bracket 1 in any other suitable manner, using interference fit, formfit, or material joint. Also, there is no need to secure the bracket 1 to a cargo compartment lining 2, but can also be provided on elements of the vehicle body, for example.

Even though the figures and figure description relate in particular to an exemplary embodiment of a bracket 1 having a holding device 18 with slanted/curved edges, the present invention is not limited thereto. Of course, other configurations of the bracket 1 according to the invention and the accommodated holding device are conceivable, for example in the form of a substantially rod-shaped (circular, square) holding device 18. In such an embodiment of the bracket 1 according to the invention, the holding device 18 can resiliently swing in and out or resiliently be pushed in and out by a suitable interaction between a sensor and an actuator, for example.

When the sensor detects a lifting or opening of a cargo compartment floor and, for example, a certain predefined opening angle is exceeded, the holding device 18 can be pivoted or pulled in the exemplary embodiment by an appropriate actuator (for example an electric motor) towards the surface of the cargo compartment lining. Should the sensor further determine that the opening angle of the cargo compartment floor is of such magnitude that an edge of the cargo compartment floor has moved past the holding device 18, the action of the actuator can be stopped and the holding device 18 swings or slides back to the initial position as a result of its resilient attachment. Now a user can let go of the cargo compartment floor which then comes to rest upon the holding device 18 due to gravity.

When the sensor then detects a renewed lifting (opening) of the cargo compartment floor about an optionally predefined angle, this can the be interpreted as a signal that the user wants to lower the cargo compartment floor again. In this case, provision may be made for the actuator to cause the holding device 18 to be pivoted or pulled in the direction of the surface of the cargo compartment lining. The cargo compartment floor can then easily be lowered back to its initial position. When the sensor ascertains a sufficiently wide lowering of the cargo compartment floor, the action of the actuator can again be terminated and the holding device 18 swings or slides back to the initial position as a result of its resilient attachment.

There are no particular restrictions relating to the material of the bracket in accordance with the invention and it can be made of any suitable material or combination of materials or mixture of materials. For example, both the base body 19 and the holding device 18 can be substantially made, for example, from plastic such as polypropylene or from metal. Edges or surfaces of the bracket according to the invention, which are subject to intense mechanical stress (e.g., as a result of friction by an edge of the cargo compartment floor), can be made, for example, from a material that is more resistant to mechanical stress than the remainder of the bracket 1 according to the invention.

The present invention also includes a vehicle, in particular motor vehicle, which is characterized in that it has at least a bracket 1 in accordance with the invention. The bracket 1 according to the invention provides for a vehicle which significantly improves comfort for a user compared to conventional vehicles with a cargo compartment floor. Furthermore, the provision of the lighting device 3 in the bracket 1 in accordance with the invention is able to achieve in particular an improved lighting or illumination of the area of the cargo compartment floor or of the stowage space located underneath a cargo compartment floor, compared to a lighting device in the roof lining or a lateral cargo compartment lining.

When providing, according to an advantageous further refinement of the vehicle in accordance with the invention, a bracket 1 according to the invention in each of the left-side and right-side cargo compartment linings, then not only can a safe and reliably releasable securement of the cargo compartment floor be provided but also, as a result of the provision of thus two lighting devices 3, a particularly uniform and possibly also particularly bright illumination of the area of the cargo compartment floor or the subjacent stowage space.

The invention claimed is:

1. A bracket for releasable securement of an open position of a cargo compartment floor in a vehicle, said bracket comprising:
 a holding device configured to be resiliently pushable from an initial position in which the holding device projects from a surface of a lateral cargo compartment lining to a position at least in part into the lateral cargo compartment lining in an installed state, said holding device being configured for releasable securement of an open position of the cargo compartment floor; and
 a lighting device provided in a part of the holding device that projects from the lateral cargo compartment lining, when the holding device is in the initial position.

2. The bracket of claim 1, wherein the lighting device has a light exit direction which in the installed state points substantially in a direction of the cargo compartment floor in its closed position.

3. The bracket of claim 1, wherein the holding device has at least two curved and/or slanted first and second edges disposed substantially diagonally opposite to each other and configured such that, in the installed state, the holding device is configured to be pushable from the initial position to the position in which it is, at least in part, pushed into the lateral cargo compartment lining by a sliding contact of an edge of the cargo compartment floor along the first or second edge.

4. The bracket of claim 3, wherein the holding device includes third and fourth curved and/or slanted edges disposed in substantial diagonal relation to each other and configured such that in a second installed state, the holding device is pushable from the initial position to the position in which it is, at least in part, pushed into the lateral cargo compartment lining by a sliding contact of an edge of the cargo compartment floor along the third or fourth edge.

5. The bracket of claim 1, wherein the lighting device includes a light-emitting diode.

6. The bracket of claim 1, further comprising at least one spring member configured to resiliently push the holding device and having in the initial position of the holding device a tension which is less than a tension of the spring member in the pushed position of the holding device.

7. The bracket of claim 1, further comprising a switching device operably connected to the lighting device to switch a light of the lighting device on and off.

8. The bracket of claim 1, further comprising a switching device electrically connected to the bracket to switch a light of the lighting device on and off.

9. A vehicle, comprising:
 a cargo compartment having a cargo compartment floor configured to be opened and having a lateral cargo compartment lining; and
 a bracket provided in at least one longitudinal side of the lateral cargo compartment lining and configured for releasable securement of an open position of the cargo compartment floor, said bracket comprising a holding device configured to be resiliently pushable from an initial position in which the holding device projects from a surface of the lateral cargo compartment lining to a position at least in part into the lateral cargo compartment lining in an installed state; and
 a lighting device provided in the part of the holding device that projects from the lateral cargo compartment lining, when the holding device is in the initial position.

10. The vehicle of claim 9, wherein the vehicle is a motor vehicle.

11. The vehicle of claim 9, further comprising a second said bracket, said brackets being provided in a right longitudinal side and left longitudinal side of the lateral cargo compartment lining, respectively.

12. The vehicle of claim 9, wherein the bracket is provided at least in a left longitudinal side of the lateral cargo compartment lining.

* * * * *